United States Patent
Korolyov et al.

(10) Patent No.: US 8,014,111 B2
(45) Date of Patent: Sep. 6, 2011

(54) METHOD AND DEVICE FOR PREVENTING FIRE CAUSED BY DEFECTS IN ELECTRIC CIRCUITS AND ARRANGEMENTS

(76) Inventors: Igor Sergeevich Korolyov, Moscow (RU); Andrey Igorevich Korolyov, Moscow (RU); Elena Igorevna Novikova, Moscow (RU)

( * ) Notice: Subject to any disclaimer, the term of this patent is extended or adjusted under 35 U.S.C. 154(b) by 379 days.

(21) Appl. No.: 11/919,961

(22) PCT Filed: May 6, 2005

(86) PCT No.: PCT/RU2005/000251
§ 371 (c)(1),
(2), (4) Date: Feb. 3, 2009

(87) PCT Pub. No.: WO2006/121364
PCT Pub. Date: Nov. 16, 2006

(65) Prior Publication Data
US 2009/0219655 A1     Sep. 3, 2009

(51) Int. Cl.
*H02H 3/00*     (2006.01)
(52) U.S. Cl. .................................................. 361/42
(58) Field of Classification Search ................ 361/42
See application file for complete search history.

(56) References Cited

U.S. PATENT DOCUMENTS

| | | |
|---|---|---|
| 5,654,684 A | 8/1997 | Boyden |
| 6,292,340 B1 * | 9/2001 | O'Regan et al. ............. 361/78 |

FOREIGN PATENT DOCUMENTS

| | | |
|---|---|---|
| EP | 0477959 | 4/1992 |
| RU | 2136097 | 8/1999 |
| RU | 2003120730 | 2/2005 |
| SU | 945936 | 7/1982 |
| SU | 1144162 | 3/1985 |
| SU | 1728919 | 4/1992 |
| SU | 1808163 | 4/1993 |

* cited by examiner

*Primary Examiner* — Stephen W Jackson
(74) *Attorney, Agent, or Firm* — Pauly Petersen & Erickson

(57) ABSTRACT

A method for preventing fire in electric circuits and arrangements includes measuring an electric current of a controllable section, separating a high frequency component therefrom, amplifying and rectifying a first harmonic signal, determining a spark current value, forming the first harmonic signal from a measured current signal range, measuring short-circuit and/or overload and/or a leak, and/or measuring the electric circuit voltage, in forming a warning and/or switching off signal of the controllable section. The signal amplitudes and/or other parameters including a spark striking-suppression cycle are measured for determining a spark current. The fire preventing device includes a unit for forming a signal of first and higher harmonics, a unit for determining a spark current quantity, a unit for measuring short-circuit and/or overload and/or leak currents, and/or electric circuit voltage measuring currents, units for forming a warning and/or switching off the controllable section signal. The spark current quantity determining unit has devices for measuring signal amplitudes and/or other parameters including a spark striking-suppression cycle.

7 Claims, 4 Drawing Sheets

CTr : current transformer

ZSCT : zero-phase sequence current transformer

LF : low frequency

HF: high frequency

METHOD AND DEVICE FOR PREVENTING FIRE CAUSED BY DEFECTS IN ELECTRIC CIRCUITS AND ARRANGEMENTS

BACKGROUND OF THE INVENTION

1. Field of the Invention

This invention relates to fire prevention and the electrical power industry, namely, to methods and devices for detecting fire originating from faults in electric networks (EN) or electric installations (EI) in buildings, constructions, houses, aircrafts, vessels, railway services and other installations.

2. Discussion of Related Art

Fire or explosions occasionally occur in dwellings, households, industrial and other installations, and originate from faults in electric networks and electric installations. Besides the basic faults, often accompanied by financial damage, death and/or permanent injury of people, sparking occurs in wiring, short circuit, and fold back current, creeping current, and large inadmissible reduction in line voltage. In Russia, according to official statistics, the impact of electrical installation fire is the second biggest problem after careless fire handling. The above specified faults are especially hazardous in the exploitation of advanced hazard facilities in the following industry branches: oil and gas production, storage and shipment, mineral industry, poisonous and explosive materials, and many other special, military and civil designation facilities with fire and explosion hazard.

For detection of these faults a number of methods and protection devices, used in EN and EI, have been developed. Among them a well-known device called Emergency Circuit Breaker (ECB), as shown in FIG. 4.7 of Reference [1] contains a differential current measurement sensor (ZFSCT—zero-phase sequence current transformer), an electromagnetic signal generator of power network shutdown, and an actuating device (release device), shutting down EN and EI in case the tracked resistance surpasses admissible values, thus preventing an electric shock or a fire.

A short-circuit protection device is shown in FIG. 4.8 of Reference [1] and contains a sensor-turn located on the release device and connected in series into the current circuit burden, shutdown signal generator (release device) and actuating device, disabling EN or EI in case the intensity of current achieves intensity of short circuit.

This device can be used for falling voltage protection if it has a winding minimum-current release device.

A protection device against overload current is shown in FIG. 4.30 of Reference [1] and contains a bimetallic release device interacting with a cogged release arm, a shaped piece, a spring with levers and contact points of the circuit-breaker.

A method and device for fire prevention of sparking in the electric network or electric installation and its realization is taught by Reference [2]. It has a wide collection of general properties, applicable to technical devices mentioned above, and is among the known and accepted prior art.

According to the well-known engineering solutions, the current of the controlled section of EN or EI is measured. The signal of the second and/or higher harmonic is singled out of the measured current by filtration of actual frequency or the low-frequency spectrum. The second harmonic characterizes the reduction process of voltage across the broken circuit with the current flow sparking through zero value. The value of the extracted signal is defined by the intensity and value of this sparking current, which depends on transient resistance. Then, the signal is strengthened and straightened. Meanwhile, the signal accumulation is performed with the previously estimated amount of the sparking current. The value of the sparking current is calculated on a measurement basis and subsequent calculation of each selected option of a cycle "arc striking-extinction", forming and fading stages, in the segments of the sparking current transition through null. To the cycle index, depending on the sparking current value, we apply, for example, repetition of the rate of the cycle, the duration of the forming and fading stages of the cycle, the quantity of pulses on the fading stage of the cycle with amplitude exceeding the specified value. The signal accumulation results, for the present time, are balanced against the preset admissible values. Meanwhile, the output of the device forms the clearance signal notifying of corresponding level of fire hazard and/or the shutdown command for the controlled section of inoperative EN or EI, which proceeds to the information display package and/or to the shutdown module of the controlled section of EN or EI.

The device of Reference [2] for realization of the specified method contains an evaluator of the sparking current value, which includes a module of signal-symptom generation of the cycle "arc striking-extinction", which provides the formation of the second or higher harmonic component signal pulse, a symptom cycle for the very cycle "arc striking-extinction"; a module of cycle index measurement and calculation or providing the formation on the first signal pulse, symptom of the time frame cycle, during which the signals of pulse-symptom are accumulated, and on completion of which recurrence rate of these cycles are estimated; and/or providing determination of duration of the formation and fading stages of the cycle and/or providing determination of quantity of pulses of the fading stage of the cycle with amplitude exceeding the specified values; a module of sparking current value calculation based upon or calculated upon the recurrence rate cycle and/or based upon the duration of the forming and fading stages of the cycle, and/or based upon the quantity of pulses of the fading stage of the cycle with amplitude exceeding the specified values; a storage module for the estimated sparking current value, providing memorization of the estimated sparking current value and its transferring to the accumulation module. The accumulation module is made with the possibility of reception of the estimated sparking current value, receiving commands from the control module on formation of the definite time interval, and realization within this time range signal accumulation by addition, upon entry of the very signal pulse, of symptom cycle of "arc striking-extinction", to preceding stack number corresponding to the estimated sparking current value. The control module is accomplished with the possibility of signal reception for realization of the specified command production with transferring of the estimated sparking current value to the accumulation module. All the commands on execution of the preset operation algorithms of the device are formed in the control module, performed, for example, in the form of a microcontroller. The power supply of the device has a supply unit, which is in turn supplied by EN and of a field ion source.

The disadvantages of the provided engineering solution includes the absence of magnitude of pulse value direct determination on forming and fading stages of the cycle "arc striking-extinction" and/or the measurement on the forming stage of a cycle, the quantity of pulses with amplitude exceeding the specified value, which could ensure the most positive and adequate definition of the sparking current strength under the severe service conditions provided to the device.

Besides, an essential complexity of the object support process by a complex protection adds an independence of the above mentioned devices on circuit from each other and design, replication of the same functions, implemented in many instances by common modules and circuit design.

Therefore, the separate application of all the essential protection devices into a fire and explosion prevention system not only practically complicates and increases the price of their usage, but generally also reduces the reliability of the electric system.

SUMMARY OF THE INVENTION

One object of this invention is to improve the authenticity and precision of measurements of the sparking current strength, as well as expansion of the functional capabilities of the fire prevention methods arising from sparking in the wiring of the dwellings, households, shop floors and other objects, which enables the reduced cost of expenditures connected with creation and exploitation of fire AWP arising from faults in EN and EI.

The above objective is achieved through the method of prevention of fire or explosion arising from faults in the electric network (EN) or electric installation (EI), containing electric current measurement of the controlled section, the signal forming of the second and higher harmonics out of signal spectrum of the measured current, its strengthening and rectifier, determination of intensity of sparking current, according to this invention, additionally contains an electrical current measurement of the short circuit and/or the overload current and/or the creeping current and/or the EN voltage. The measurement of short-circuit current and/or overload current is done by allocation out of the measured electric current of the controlled section of a signal of the first harmonic, and the leakage of the current measurement and EN voltage occurs via corresponding connection of current-sensing leakage devices and to it EN or EI, for definition of the sparking current the quantity of magnitude of pulses measured on the forming and/or dying stages of the cycle "arc striking-extinction"; and/or the quantity of pulses on the forming stage of a cycle, which amplitude exceeds the specified value.

The device for realization of the specified method contains: a module for electrical current measurement of the controlled section; a signal-conditioning module of the second and/or higher harmonic; an amplifier unit; a rectifier module; a module of intensity of sparking current definition; also contains according to this invention a first harmonic signal-conditioning unit, a module of electrical current measurement of a short circuit and/or a module of overload current measurement, and/or a module of creeping current measurement with a creeping current sensor, and/or an EN voltage measurement module, and the block of the intensity of sparking current definition is supplied with a device of range magnitude of pulse measurement on the forming and the dying stages of the cycle "arc striking-extinction" and/or with a device for the quantity of pulses measurement on the forming stage of a cycle with amplitude exceeding the specified value.

Thus, the well-known engineering solution, besides the operations of high-frequency current components allocation, selected cycle "arc striking-extinction" criterion measurement and calculation, and calculation and recording of sparking current intensity, additionally measures the pulse amplitude quantity on the forming and/or dying stages of a cycle "arc striking-extinction", and/or introduces the following additional operations: the first harmonic signal forming, arriving signal measurement, comparison of measured quantity of the arriving signals with their preset values; and forming of signal notifying about faults or EN or EI operation failure. Thus, on the basis of technical and economic feasibility, the mentioned additional operations can be introduced in full or limited scope. The execution of the specified operations irrespective of or in association with other well-known measurement operations of a cycle "arc striking-extinction" parameters, enables not only to enhance the authenticity and precision of the intensity of sparking current measurements, but also to expand the functional capabilities of the provided engineering solution or to implement five types of protection including protection from sparking; protection from short-circuit protection; protection from overload current; and protection from creeping current and falling voltage protection. This invention has distinguishing features, unknown to state of the art, that allows drawing a conclusion about its correspondence to the patentability condition called "novelty". The collection of the essential features of the described invention, which predetermine the specified technical results, does not follow from the equipment level explicitly, that allows making an inference about correspondence of this invention to the patentability condition called "degree of inventiveness". The patentability condition "industrial applicability" was confirmed by actual realization.

BRIEF DESCRIPTION OF THE DRAWINGS

The engineering solution of this invention is explained by the drawings, where.

DETAILED DESCRIPTION OF THE INVENTION

Figure 4:
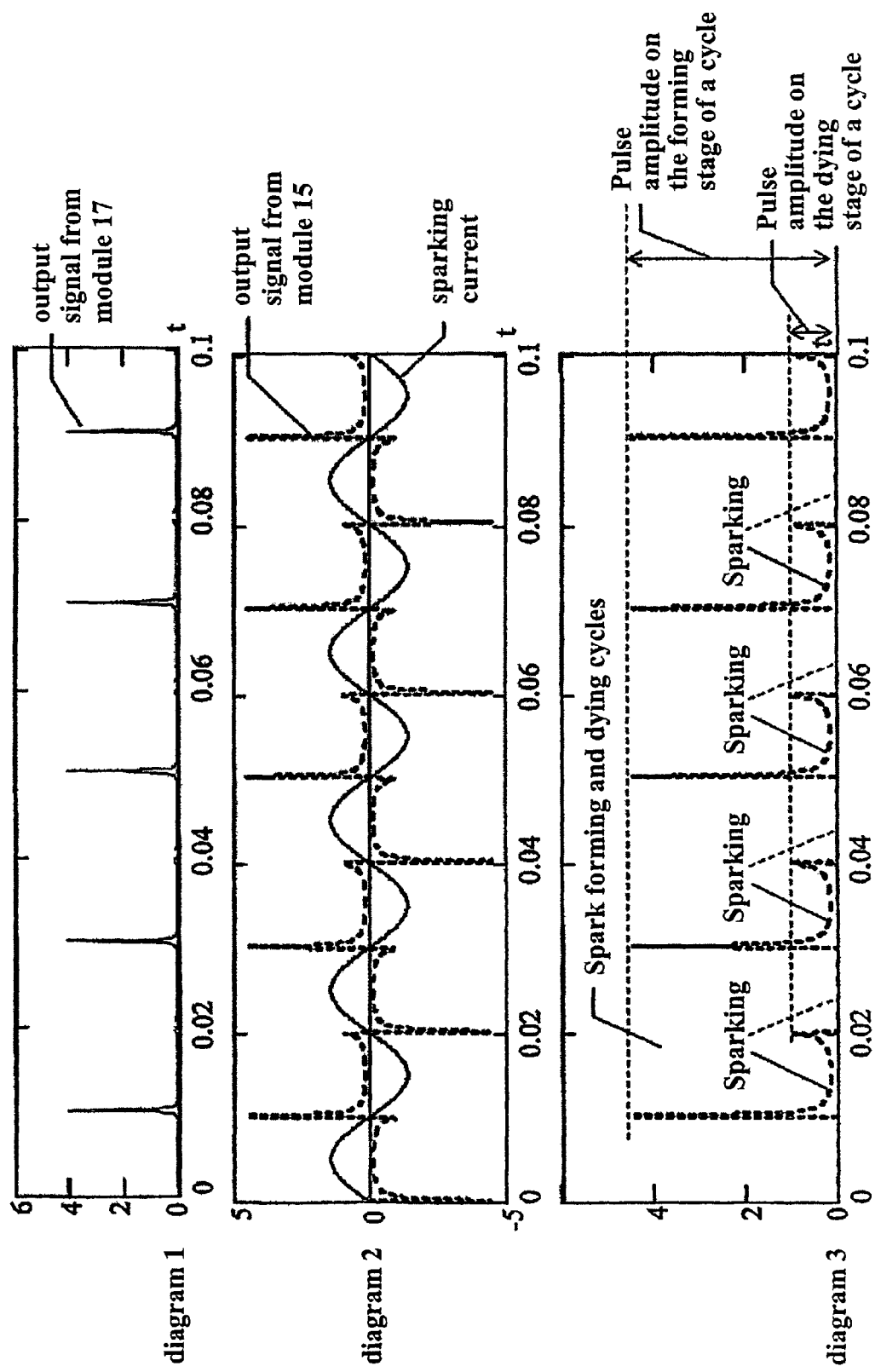
FIG. 4 represents diagrams, illustrating processes which accompany sparking, as well as conception of a cycle "arc striking-extinction", its forming and/or dying stages.

Diagram 1 of FIG. 4 represents a wave shape, appearing in the output of module 17 lined with sparking formation on any section of the controlled EN or EI. Diagram 2 of FIG. 4 represents sparking current time behavior, practically equal to the standard load current, and signal format in the output of module 15 with formation of high frequency spectrum at the moments of sparking current strength transition through the null. Diagram 3 of FIG. 4 shows definitions of the term cycle "arc striking-extinction" and its basic constituent stages, including spark producing, sparking itself and blanking.

Figure 1:
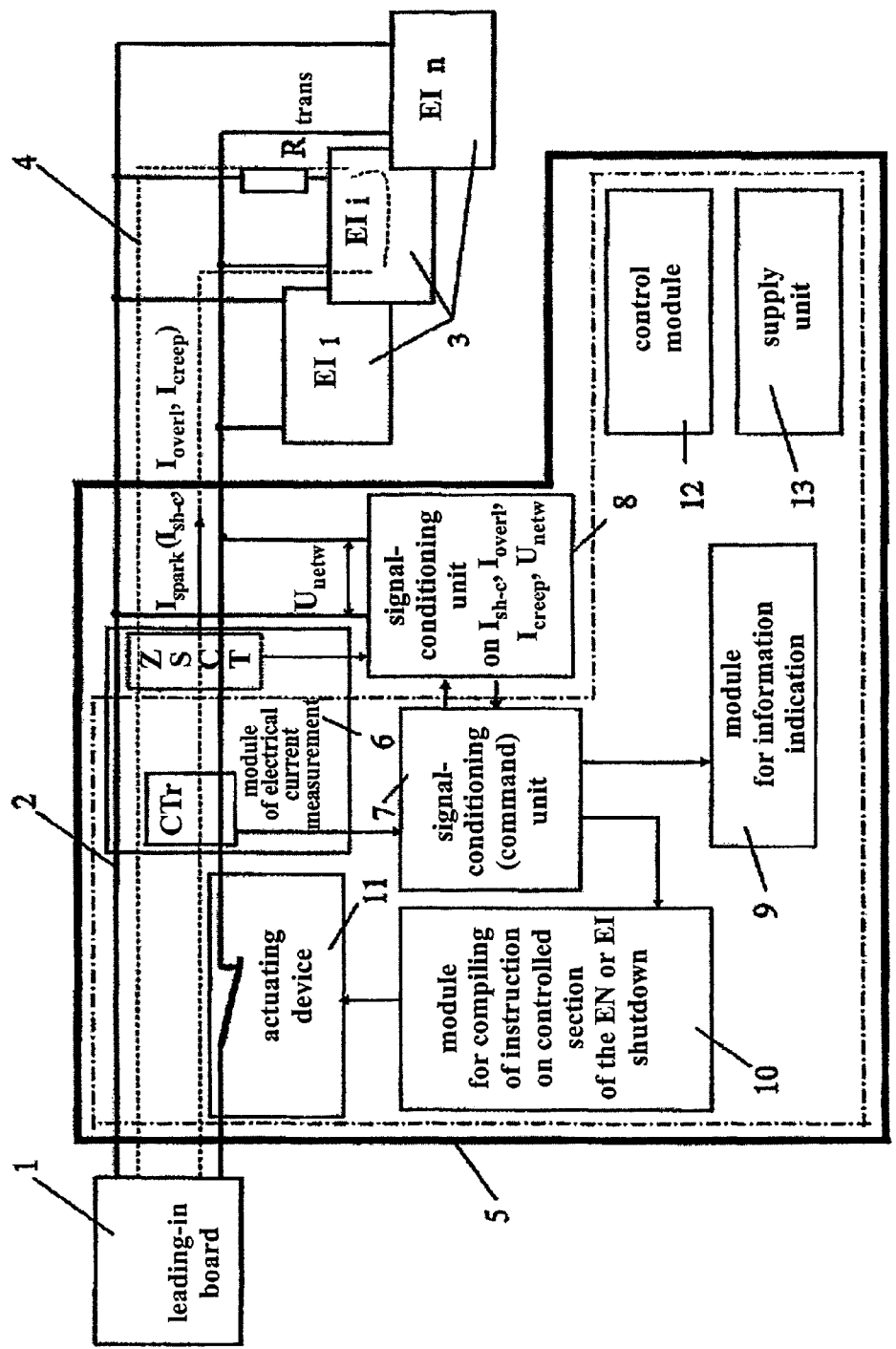
FIG. 1 represents a connection figure of a fire protection device to electric network of the premises.

FIG. 1 represents, as an example, a scheme of a premises, containing leading-in board 1, electric network wires (EN) 2, electric installations (EI) 3, electric circuit 4, as well as a block scheme 5 of the fire warning device from faults in the EN and EI. The electric circuit 4 is formed with a burden connection to the electric network, which in the example under consideration is an electric installation.

The device 5 contains: module 6 of electrical current measurement, serving as total current measurements; signal-conditioning unit 7 on sparking current; signal-conditioning unit 8 on short-circuit current on short-circuit current ($I_{sh-c}$), overload current ($I_{overl}$), on creeping current deviation ($I_{creep}$) and on circuit voltage deviation (Unetw); module 9 for information indication; module 10 for compiling of instruction on controlled section of the EN or EI shutdown; actuating device 11; control module 12; and supply unit 13.

The signal-conditioning unit 7 on sparking includes the following modules: module 14 of low frequency spectrum filtration (LF-spectrum); module 15 of high frequency spectrum formation (HF-spectrum); amplifier unit 16; rectifier module 17; module 18 of sparking current strength determination; accumulation module 19; comparator unit 20; module 21 for preset values storage; signal-conditioning unit 22. Modules 7, 9-13 completely form a block scheme of the sparking fire warning device in EN or EI. Module 6—only as a part of current transformer (CTr) their structure and work reflected in Reference [2]. Module 8 is also introduced.

Module 6 includes a sensor for signal measurement from sparking current, which could be performed in the form of, for example, iron and winding, representing along with a network wire a current transformer (CTr). In case of application of protection from creeping current, the module 6 can be included with a sensor of creeping current measurement, which could be made as, for example, iron and winding, representing along with two or three wires (in case of three-phase network) a zero-phase sequence current transformer.

Modules 7, 9-13 were described earlier as a part of prior art.

Figure 2:
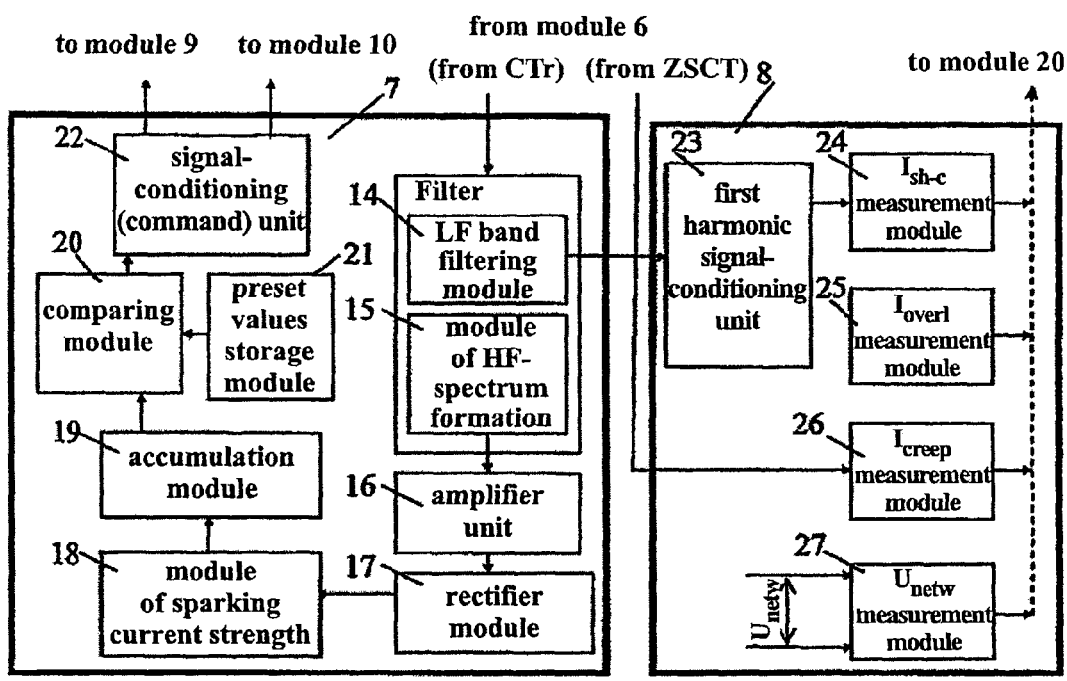
FIG. 2 represents a scheme of a signal-conditioning unit on sparking and signal-conditioning unit on short-circuit current, overload current, creeping current and EN voltage.
Figure 3:
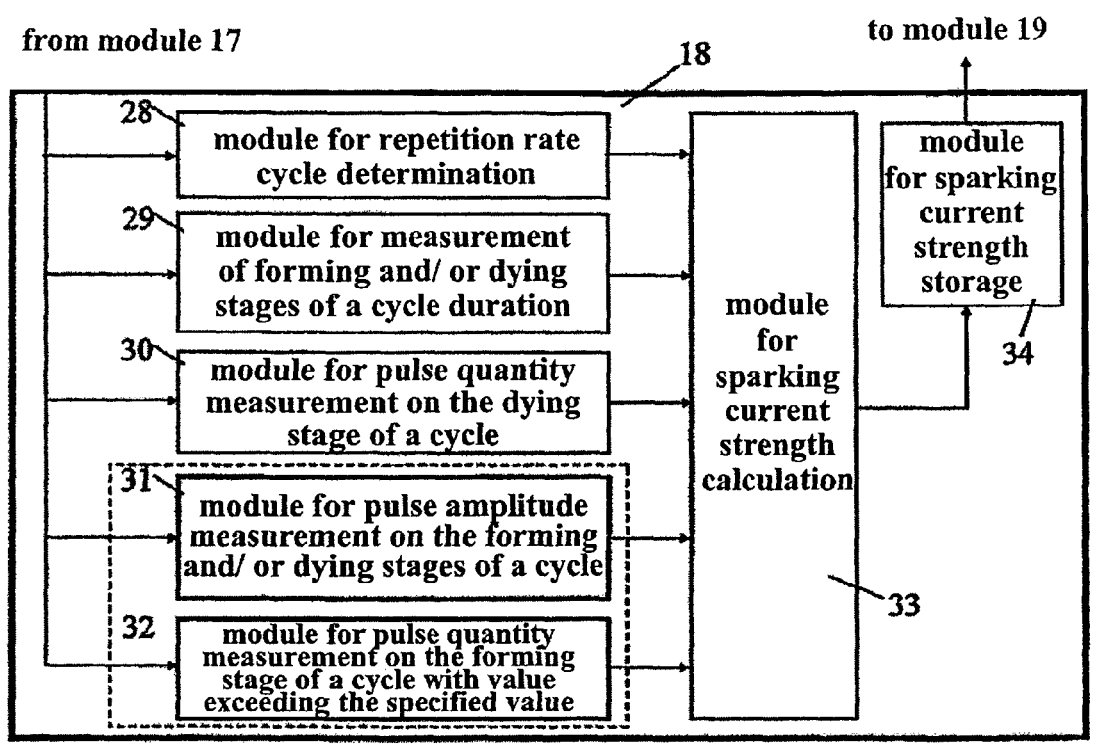
FIG. 3 represents a module for sparking current strength determination.

Signal-conditioning unit on sparking, shown in FIG. 2, contains: first harmonic signal-conditioning unit 23; modules 24-27 for measurement of arriving of signals $I_{sh-c}$, $I_{overl}$, $I_{creep}$, $U_{netw}$, accordingly. The measured quantities of the arriving signals, normalized to a single type, for example to a pulse form, proceed to a corresponding input of comparing unit, where they are compared with preset values, which proceed to other inputs of the comparing unit with the corresponding outcome of module for storage of preset values 21. The first harmonic signal-conditioning unit 23 singles out of previously filtered signals of the low frequencies spectrum (module 14) the signal of the first harmonic, for industrial network of Russia this signal has the frequency 50 Hz (cycles per second). The first harmonic signal is used for electrical current measurements of short circuit and overwork.

$I_{sh-c}$ measurement module 24 measures short-circuit current preliminary transformed, for example, into pulse form (basic operation: strengthening; rectifier; transformation of the direct voltage into alternating voltage with frequency proportional to input signal value; half-wave detection).

Further, the module carries out the measurement of quantity pulses for a preset time by, for example, pulse meters. The results of counting from the outcome of module 24 proceed to the input of comparing unit 20, where they are compared to the preset values.

The preset values on short circuit current strength proceed into comparing module 20 out of preset values storage module 21 after a command out of control module 12.

The results of comparison in the form of a pulse, which is formed when the measured values deviate from the admissible, proceed to the signal (command) forming module 22, from the outcome of which the signal proceeds to the information mapping module 9 and/or module 10 to form a command for shutting down the section of EN or EI under control.

Thus, the short circuit protection function is realized by involvement of CTr and modules 14, 23, 24, 20, 21, 22, 9, 10, 11, 12, 13.

Bold-faced type emphasizes the block numbers which are out of use in sparking protection device.

In the same manner the protection devices operate from:
overload current (CTr and modules 14, 23, 25, 20, 21, 22, 9, 10, 11, 12, 13);
creeping current (CTr and modules 26, 20, 21, 22, 9, 10, 11, 12, 13); and
network undervoltage (modules 27, 20, 21, 22, 9, 10, 11, 12, 13).

Module 18 for sparking current strength determination includes: module 28 for repetition rate cycle determination; module 29 for measurement of forming and/or dying stages of a cycle duration; module 30 for pulse quantity measurement on the dying stage of a cycle; module 31 for pulse amplitude measurement on the forming and/or dying stages of a cycle; module 32 for pulse quantity measurement on the forming stage of a cycle with value exceeding the specified value; module 33 for sparking current strength calculation; and module 34 for sparking current strength storage.

The complex protection of the objects is provided by: a measurement signal from sparking current $I_{spark}$; a short-circuit current measurement $I_{sh-c}$; an overload current measurement $I_{overl}$; a creeping current measurement $I_{creep}$; and a system voltage measurement $U_{netw}$. The measurement process of the described arriving signals ends by formation of signal output (fire hazard signal) and/or shutdown commands for the controlled section of the electric network or electric installation.

The fire warning device against faults in EN and EI 5 operates in the following manner. Device 5 by module 6 is for burden total current measurement of the controlled section of EN or EI and zero-phase-sequence current measurement performed in the form of, for example, a current transformer (CTr) or a zero-phase sequence current transformer (ZPSCT) connected, for example to the leading-in board 1. Module 8 of the same device is connected to the same leading-in board for voltage measurement $U_{netw}$ of the electric network 2. Thus, the whole electric network (all electric installations) located behind the place of installation of device 5 (in the presented example behind the leading-in board) is the subject of control.

As an example, there is a consideration to the work of device for protection from sparking current.

When the electric network 2 and electric installations 3 are working properly (FIG. 1) through its wire, which is at the same time, the primary winding of the current transformer CTr of the measurement module 6, electric current flows with the power-line frequency with volume equaling the total load current of all consumers. The electromotive force (EMF), induced in transformer secondary current, proceeds to the input of the signal (command) conditioning unit 7 for sparking. In the module 7 (FIG. 2) the signal gets through a filter, and is adjusted, for example, to the low frequencies spectrum. Thus, the signal with frequency equaling to the power-line frequency is practically completely filtered out and sent to module 23 for the first harmonic signal forming. At this time, at the input of amplifier unit 16, regardless of the current strength of the burden, in the absence of any fault the signal volume is always close to null. After the rectifier module 17, sparking current strength determination module 18, and accumulation module 19, there would be direct component of the signal, which volume is defined by the filter alignment error, harmonic distortion of the measured load current and admissible values of the transient resistance in every several contact points of switching equipment and wire-logic connections, and is understood by unit 20 as logical zero.

With the beginning of a fault, related to formation of ionizable transient resistance $R_{trans}$ at the place of, for example, poor contact point, in electric circuit 4 of electric installation 3 the sparking current arises (current of free ions and corpuscles), appearing in the form of a sequence of cycles "arc striking-extinction". As a result, there appears a high-frequency component of electric current, overlapping the total loading of the current.

On the current of transformer secondary CTr of measurement module 6 EMF is induced. In the filter output a signal of high frequency spectrum rises, proceeding to the input of amplifier unit 17. The reinforced signal is straightened in the module 17 and enters to the module 18 of sparking current strength determination, particularly to module 31, where with the help of, for example, analogue digital transducer and an pulse amplitude measurement is carried out, for example, on the dying stage of the cycle on the first and/or on any other selected pulse.

The signal, proportional to the pulse measured amplitude, proceeds to sparking current strength calculation module 33 with outcome plugged into the input of sparking current strength storage module 34.

After memorizing the estimated sparking current value, the control module 12 forms a command for definite time interval performance and signal accumulation within it, the signal accumulation is performed in the module 19 by addition upon entry of every pulse or cycle "arc striking-extinction" to the preceding number stack, corresponding to the value memorized in the sparking current module 34.

The level of accumulated signal, defined by the intensity of arrival of pulses or cycles "arc striking-extinction" and sparking current strength, is continuously compared to its admissible value or values, stored in the module 21. When the accumulated signal excesses the admissible values, in the output of a comparing unit a signal is formed, corresponding to the danger level, which enters the signal-conditioning unit 22. In module 21 the characteristics of the signal are brought to the necessary and sufficient level to support the normal running of the information mapping module 9 and the network controlled section shutdown module 10.

As a result of implementation of this invention into industrial and household installations, as well as into the quality control structures of their designing and exploitation, the safety exploitation of these installations and, particularly, their fire prevention improve. Besides, the cost expenditures connected with implementation of system preventing from fire, explosions and faults in the electric network and electric installations is lower with generally increased reliability of the electric system.

The last statement is proved by the values below:

supplementary employment of 4 new independent protection systems requires introduction of 38 new modules; and supplementary employment of 4 new protection systems with protection from sparking, requires introduction only of 14 new modules.

Implementation of this invention would lead to reduction of cases of fire in dwellings and shop floors, constructions, houses, aircrafts, vessels, railway services and other facilities with electric network and electric installations. Furthermore, the number of electricity caused injuries will reduce, as well as household and other equipment breakdowns caused by inadmissible undervoltage in the electric network. The implementation of devices, realizing the proposed method, assumes employment of associated parts and elements. This does not require alteration to plant industry and private companies to produce a new range of products.

The economical and ethical gain from the work of this invention is defined by a number of saved lives, as well as by the number and the cost of dwellings, industrial and other installations, saved from fire by the proposed technical decision.

In such a manner, the implementation of the proposed method of fire prevention from faults in electric network or electric installation enhances protection of people, dwellings, industrial and other installations from damaging action of fire, and would ensure a substantial saving of material and financial assets of every citizen and the state in general.

SOURCES OF REFERENCE

1. I. C. Taev. Electric apparatus of control. M., Vysshaya shkola. 1984.
2. Claim for an invention RU 2003120730, MPK 7 G08B 17/06, G08B 25/10, filing date 2003.07.10, resolving from 2005.02.01. About issue of patent for invention "Method and apparatus for fire prevention of sparking in electrical network".

The invention claimed is:

1. A method of fire prevention from faults in electric networks or electric installations containing measurement of electric current of a controlled section, the method comprising:
    forming a signal of a first harmonic and of a second and higher harmonic from a spectrum of a measured current;
    measuring at least one of a short-circuit current measurement an overload current, a creeping current, or an electric network voltage, the short-circuit current and the overload current measured by allocation of a first harmonic signal out of the measured electric current of the controlled section, and at least one of the creeping current measurement or the electric network voltage measurement performed by at least one of a connection of a leakage current sensor, or feeding to the device the electric network voltage or electric installation voltage; and
    measuring, for sparking a current determination, a quantity of a pulse amplitude at at least one of a forming stage, a dying stage of a cycle of arc striking-extinction, or a pulse quantity of a forming stage of a cycle with an admissible amplitude.

2. The method according to claim 1, wherein a device contains a module of current measurement for the controlled section, a signal-conditioning unit for at least one of the second or higher harmonic formation, an amplifier unit, a rectifier module, a module of sparking current strength determination, the device comprising: a module of first harmonic signal formation—that contains at least one of the short-circuit current measurement module, the overload current measurement module, the creeping current measurement module with the creeping current sensor, or the voltage measurement electric network module, where a sparking current strength determination module is supplied with a device for pulse amplitude value measurement at least one of the forming stage, the dying stages of a cycle arc striking-extinction, or a device for quantity pulse measurement at the forming stage of a cycle with amplitude exceeding the specified values.

3. A method of fire prevention from faults in an electric network, comprising:
    measuring an electric current in a monitored section of the electric network;
    forming a signal of a first harmonic and of a second and higher harmonic from a spectrum of the measured current;
    measuring at least one of a short-circuit current, an overload current, a leakage current, or an electric network voltage, wherein the short-circuit current and the overload current are measured by separating the signal of the first harmonic from the measured electric current of the monitored section;
    measuring amplitudes of pulses for determining a magnitude of an arcing current in at least one of a forming or decaying stage of an arc striking-extinction cycle; and
    measuring a number of pulses having an amplitude exceeding a set value in the forming stage of the cycle.

4. The method of claim 3, further comprising amplifying and rectifying the signal.

5. The method of claim 3, wherein the leakage current and the electric installation voltage are measured by connecting a leakage current sensor and applying voltage to the electric network.

6. A device for implementation of the method of claim 3, comprising:
- a module for measuring the electric current in the monitored section;
- a module for forming the signal of the first harmonic and the second and higher harmonic; and
- a module for determining the magnitude of the arcing current,
- at least one of a short-circuit current measurement module, an overload current measurement module, a leakage current measurement module with a leakage current sensor, or a power grid voltage measurement module, wherein the module for determining the magnitude of the arcing current includes a device for measuring the magnitude of the amplitude of the pulses in the at least one of the forming or decaying stage of the arc striking-extinction cycle, and a device for measuring, in the forming stage of the cycle, the number of pulses having the amplitude exceeding the set value, wherein the devices for measurement of pulse amplitude and the number of pulses can be applied individually or together.

7. The device of claim 6, further comprising an amplification module and a rectification module.

* * * * *